(12) United States Patent
Douglass et al.

(10) Patent No.: US 6,259,232 B1
(45) Date of Patent: *Jul. 10, 2001

(54) BATTERY PACK

(75) Inventors: James M. Douglass, Carrollton; Richard E. Downs, Dallas; Richard William Ezell, Carrollton, all of TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,210

(22) Filed: May 24, 2000

Related U.S. Application Data

(63) Continuation of application No. 09/045,302, filed on Mar. 20, 1998.

(51) Int. Cl.$^7$ .................................................. H01M 10/46
(52) U.S. Cl. ............................................................. 320/133
(58) Field of Search ...................................... 320/127, 128, 320/132, 133, 135, 130, 150, 155, 149, DIG. 21

(56) References Cited

U.S. PATENT DOCUMENTS

| | | | |
|---|---|---|---|
| 5,280,231 | * | 1/1994 | Kato et al. . |
| 5,284,719 | * | 2/1994 | Landau et al. . |
| 5,357,203 | * | 10/1994 | Landau et al. . |
| 5,432,429 | * | 7/1995 | Armstrong, III et al. . |
| 5,513,235 | * | 4/1996 | Douglass et al. . |
| 5,529,069 | * | 6/1996 | Dias et al. . |
| 5,532,935 | * | 7/1996 | Ninomiya et al. . |
| 5,621,302 | * | 4/1997 | Shinohara . |
| 5,627,449 | * | 5/1997 | Fujiki . |
| 5,629,600 | * | 5/1997 | Hara . |
| 5,818,202 | * | 10/1998 | Miyamoto et al. . |

* cited by examiner

Primary Examiner—Edward H. Tso
(74) Attorney, Agent, or Firm—Jenkens & Gilchrist, A Professional Corporation

(57) ABSTRACT

A rechargeable battery pack with low powered, gas gauge circuitry for monitoring and accumulating various operating parameters of the rechargeable battery pack, includes a current monitor for measuring the current flow into and out of a battery cell in the rechargeable battery pack. An integrated current accumulator connected to the current monitor is used to maintain a measure of the net charge having flowed into and out of the battery cell. A charging current accumulator, which is also coupled to the current monitor, is used to maintain a measure of the total charge having flowed into the battery cell, while a discharging current accumulator is used to maintain a measure of the total charge having flowed out of the battery cell. A highly accurate oscillator is used to drive the accumulators to greatly increase the accuracy of the gas gauge functions derived therefrom.

37 Claims, 2 Drawing Sheets

BATTERY PACK

This application is a continuation of Ser. No. 09/045,302 filed Mar. 20, 1998.

FIELD OF THE INVENTION

This invention relates to battery packs, and more particularly, but not by way of limitation, to rechargeable battery packs having circuitry for monitoring and accumulating various operating parameters of a battery cell within the rechargeable battery pack, whereby these parameters can be used to accurately determine the remaining operating life of the rechargeable battery pack.

BACKGROUND OF THE INVENTION

Many portable electronic systems, such as laptop computers and cellular phones, utilize rechargeable battery packs to receive their power. Such battery packs have the advantage that they are portable, relatively weight efficient, and can be charged and discharged many times. However, due to certain characteristics of existing rechargeable battery packs, an accurate indication of the remaining charge is very difficult to determine.

As can be appreciated, it is very desirable to be able to accurately determine the remaining operating life of a rechargeable battery pack used in a system such as a laptop computer. This enables a user to get maximum use out of the rechargeable battery pack. This is especially critical when the remaining energy of the rechargeable battery pack falls below the operating threshold of the computer. A user would ideally want to be able to safely shut down the computer prior thereto, thereby preventing any potential loss of information.

The amount of the charge flowing into and out of the rechargeable battery pack during charging and discharging are parameters that can be monitored and used to calculate the remaining charge of a rechargeable battery. As can be further appreciated, the more accurately and reliably this information is measured and accumulated, the more accurate the calculation of the remaining charge of the rechargeable battery.

In addition to the discharge that occurs during regular use of a rechargeable battery pack, a rechargeable battery pack will also have a certain amount of self-discharge when not in use. This self-discharge is very difficult to account for when calculating the remaining charge of the rechargeable battery. In existing rechargeable battery packs, the amount of time the rechargeable battery pack is not being used is very difficult to determine. Additionally, the amount of self-discharge of a rechargeable battery will fluctuate with varying temperatures. As can be appreciated, a problem with existing rechargeable battery packs is that they do not take into account the self-discharge of the battery, nor do they take into account the varying temperatures when calculating the remaining charge of the rechargeable battery.

Therefore, there is a need for a rechargeable battery pack having accurate and reliable gas gauge circuitry that incorporates self-discharge accounting to determine the remaining operating life of the rechargeable battery pack.

SUMMARY OF THE INVENTION

The present invention overcomes the above identified problems as well as other shortcomings and deficiencies of existing technologies by providing a battery pack with highly accurate, oscillator driven gas gauge circuitry used to accurately determine the remaining operating life of the battery pack.

The present invention further provides a rechargeable battery pack with low powered gas gauge circuitry for monitoring and accumulating various operating parameters of the rechargeable battery pack, whereby the determination can be made as to the remaining operating life of the rechargeable battery pack. The rechargeable battery pack includes a current monitor for measuring the charge having flowed into and out of a battery cell within the rechargeable battery. An integrated current accumulator connected to the current monitor is used to maintain a net accumulated total of current flowing into and out of the battery cell. A charging current accumulator, which is also coupled to the current meter is used to maintain a measure of the total charge having flowed into the battery cell, while a discharging current accumulator is used to maintain the total charge having flowed out of the rechargeable battery. A highly accurate oscillator is used to drive the accumulators to greatly increase the accuracy of the gas gauge functions.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION

Figure 1:
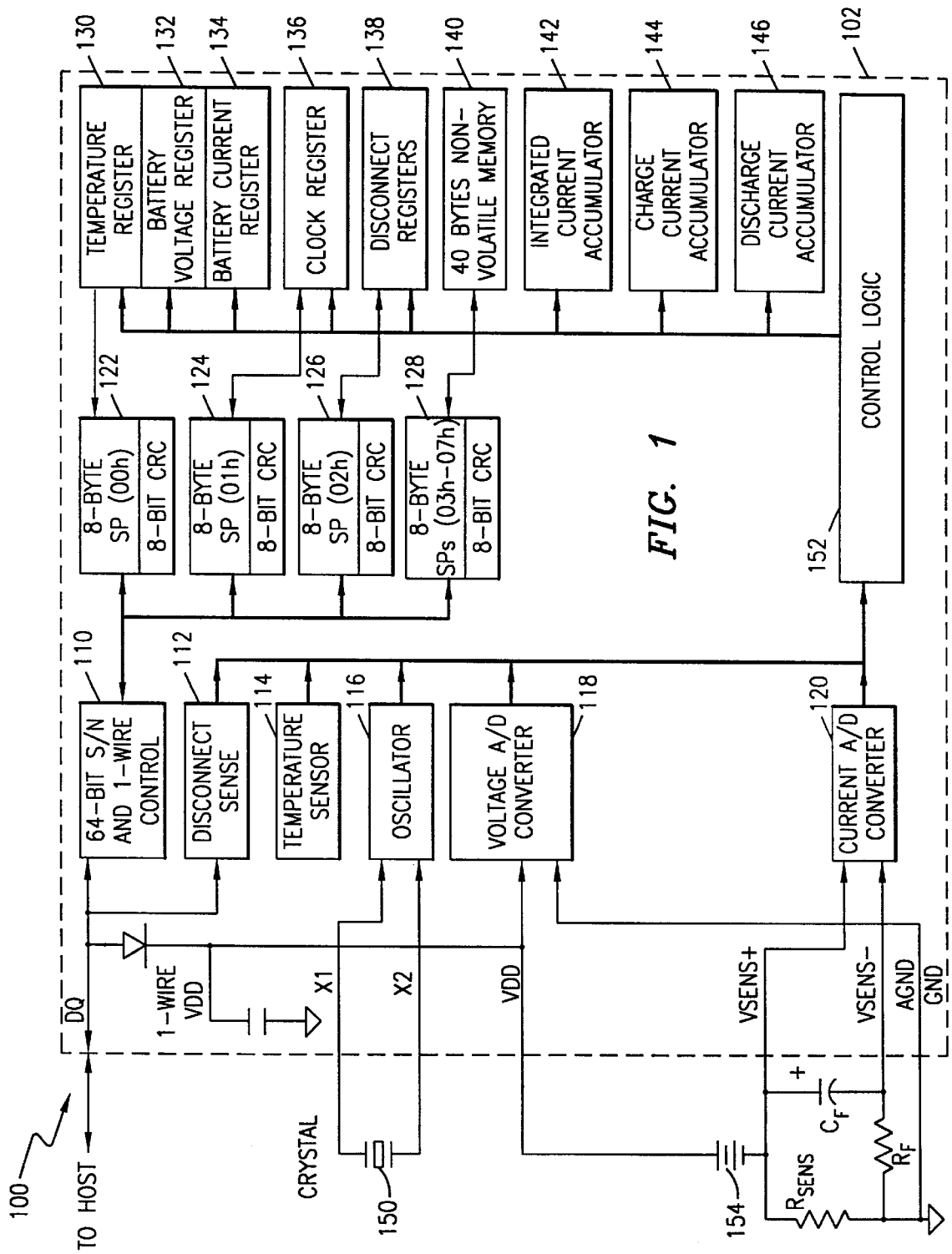
FIG. 1 is a diagram illustrating a battery pack utilizing the present invention.

With reference now to FIG. 1, there is illustrated a schematic diagram illustrating an exemplary embodiment of a battery pack 100 in accordance with the principles of the present invention.

As depicted, battery pack 100 includes a gas device or battery monitor 102 and some peripheral circuitry that is connected thereto.

The Dallas Semiconductor DS2437 Smart Battery Monitor illustrates an exemplary embodiment of battery monitor 102, the data sheet of which is incorporated herein by reference.

Still referring to FIG. 1, battery monitor 102 includes a 64-Bit serial number and one-wire control circuitry 110; disconnect sense circuitry 112; temperature sensor 114; an oscillator, e.g. oscillatory circuitry 116; a voltage analog-to-digital converter 118; a current analog-to-digital converter 120; scratch-pad memories 122, 124, 126 and 128, each having an 8-bit CRC; a temperature register 130; battery voltage register 132; battery current register 134; clock register 136; disconnect registers 138; non-volatile memory 140; an integrated current accumulator 142; a charge current accumulator 144; a discharge current accumulator 146; and control logical circuitry 152.

As further depicted in FIG. 1, some of the peripheral circuitry includes a crystal 150, and battery cells or batteries 154.

The use of the 64-bit serial number and single-wire control 110 allows the tagging of battery pack 100 with a unique serial number such that multiple battery pack monitors could exist and be utilized on the same single-wire data bus, i.e. several battery packs could be charged/monitored by the same host system. Additionally, in an exemplary embodiment, temperature sensor 114 eliminates the need for thermistors in the battery pack through the utilization of a direct-to-digital temperature sensor. Voltage analog-to-digital converter 118 and current analog-to-digital converter 120 measure the rechargeable battery's voltage and current, respectively. Analog-to-digital converters 118 and 120 permit the monitoring of battery cells 154 to determine the end-of-charge and the end-of-discharge thereof Integrated current accumulator 142 keeps track of the remaining capacity of battery cells 154, while the charging current accumulator 144 keeps a running total of all charge having flowed into battery cells 154, and the discharging current accumulator 146 keeps a running total of all charge having flowed out of battery cells 154. The current measurements of the current analog-to-digital converter 120 and the values stored in 142, 144 and 146 current accumulators can be utilized to calculate the capacity remaining in battery cells 154. The data generated by oscillator 116, i.e. clock data, is stored in clock register 136, and can be used to calculate battery self-discharge or time-related charge termination limits.

Battery monitor 102 can receive power over a one-wire data bus connected to input pin DQ, which is connected to the one-wire control circuit 110. Battery monitor 102 "steals" power whenever the signal at the DQ I/O is high; this is known as "parasite" power. The advantage of parasite power is that serial numbers stored in memory can be read in the absence of normal power, such as when the battery cells 154 are completely discharged.

Still referring to FIG. 1, temperature sensor 114 is used to measure the temperature of rechargeable battery pack 100, with the data corresponding to the sensed temperature of the rechargeable battery pack 100 being stored in temperature register 130. Generally a temperature reading is taken at selected intervals, determined by oscillator 116, wherein the data corresponding to the sensed temperature is passed to temperature register 130 by control logic circuitry 152. It can then be accessed by a user through DQ input/output over a one-wire data bus controlled by one-wire control circuitry 110. In one exemplary embodiment, good results have been achieved by using a temperature sensor wherein the data corresponding to the sensed temperature is converted by the temperature sensor from analog to digital, such that the temperature data can be transmitted digitally, directly from the battery monitor over the one-wire data bus by one-wire control 110.

Although the exemplary embodiment of the present invention as described herein is depicted as utilizing one-wire data bus technology, it is contemplated that the present invention is not necessarily limited to this technology, but rather can be practiced with virtually any type of data bus technology, such as, but not by way of limitation, two wire data bus architecture and three wire data bus architecture.

Still referring to FIG. 1, voltage analog-to-digital converter 118 is coupled to battery cells 154 through the VDD port. Voltage analog-to-digital converter 118 measures and determines the voltage of rechargeable battery. Voltage analogto-digital converter 118 performs an analog-to-digital conversion when instructed to do so by a command received from the host at the DQ input/output. The result of the voltage measurement is placed in battery voltage register 132, which is a two-byte register. This information is accessible by external devices through DQ I/O interface.

Still referring to FIG. 1, battery pack 100 includes current analog-to-digital converter 120 which is used to monitor current flow into and out of the battery cells 154. In one exemplary embodiment, current analog-to-digital converter 120 includes a sigma-delta analog-to-digital converter that measures the current flow into and out of battery cells 154. This is performed at a rate of 32 measurements/sec as clocked by oscillator circuit 116 with no user command required to initiate the current flow measurements. Current is measured into and out of battery cells 154 through the VSENS pins, with the voltage from the VSENS+ pin to the VSENS- pin equal to the voltage across capacitor $C_F$. Good results have been achieved by connecting current analog-to-digital converter 120 to a filter (resistor, $R_F$ and capacitor, $C_F$) which serves to average the voltage across $R_{SENS}$ (which reflects the current into or out of the battery). This filter is configured to capture the effect of current spikes that may occur during operation. By averaging current spikes, current accumulators 142, 144 and 146 can more accurately reflect the total charge which has gone into and out of the battery. In one exemplary embodiment, the current is presented as a 9-bit signed number with 10-bit resolution, with the last completed measurement written to battery current register 134.

Still referring to FIG. 1, there are three current accumulators, an integrated current accumulator (ICA) 142, a charging current accumulator (CCA) 144, and a discharging current accumulator (DCA) 146, with each accumulator being driven by oscillator 116. Each accumulator further includes a register associated therewith. ICA 142 maintains a net accumulated total of current flowing into and out of battery cells 154, whereby a reading taken from the register of ICA 142 gives an indication of the remaining capacity of battery cells 154, and can be used in performing gas gauge functions.

CCA 144 is used to accumulate battery charging (positive) current, while DCA 146 is used to accumulate discharging (negative) current. The information generated by CCA 144 and DCA 146 is used to determine the end of battery life of the rechargeable battery, based on the total charge/discharge current over the battery's lifetime. The current measured by current analog-to-digital converter 120 yields a result which is the average of the current measured over the select time interval clocked by oscillator 116 (such as every 31.25 ms). This measured current is then used to increment or decrement the register of ICA 142, increment the register of CCA 144 (if current is positive), and increment the register of DCA 146 (if the current is negative).

In an exemplary embodiment, ICA 142 is a 0.01resolution, 8-bit volatile binary counter driven by oscillator 116 and represents the amount of capacity remaining in battery cells 154. The amount of capacity remaining in battery cells 154 is measured in terms of the full capacity (1C) of the rechargeable battery normalized to a count of $100_{10}$. Thus, an ICA count of $100_{10}$ represents IC of charge, i.e. 100% capacity or fully charged. An ICA count of 0 represents 0% capacity, i.e. fully discharged. In this exemplary embodiment, ICA 142 will count up to $255_{10}$ (2.55C), since charging of a rechargeable battery typically provides to the battery more than its capacity. When this occurs, ICA 142 can be reset to a count of $100_{10}$ when charging is complete, to indicate that the rechargeable battery is at 100% of capacity, and to further ensure that later gas gauge measurements are accurate.

Still referring to FIG. 1, in this exemplary embodiment of system 100, CCA 144 is a two-byte, 0.32C resolution, non-volatile read/write counter which represents the total charging current battery cells 154 have encountered in their lifetime. CCA 144 is only updated when current through $R$SENS is positive and battery cells 154 are being charged. The non-volatility of the register of CCA 144 will allow this information to accumulate over the lifetime of battery pack 100 and will not be lost when battery cells 154 become discharged.

DCA 146 is a two-byte, 0.32C resolution, non-volatile counter which represents the total discharging current battery cells 154 have encountered over their lifetime. DCA 146 is only updated when current through $R_{SENS}$ is negative and battery cells 154 are being discharged. As with the register of CCA 144, the non-volatility of the register of DCA 146 allows this information to accumulate over the lifetime of battery pack 100 and will not be lost when battery cells 154 become discharged. In normal operation, when battery cells 154 become fully discharged, the value of the register of ICA 142 reaches 0, while the values of the registers of CCA 144 and DCA 146 are maintained.

Continuing to refer to FIG. 1, oscillator circuit 116 and crystal 150 together form a highly accurate clock used to generate a timing signal which is used for the timebase of the timekeeping functions. In operation, oscillator circuit 116 is driven by crystal 150 and operates as a clock with a four-byte binary counter with a 1-second resolution. The four bytes are a count of seconds. The timekeeping functions are double buffered, allowing a user to read time without the data changing while it is being read. This is accomplished by taking a "snapshot" of the counter data and transferring it to clock register 136, which the user accesses.

As described herein above, the three current accumulators operate at select time intervals as clocked by the timing signal generated by oscillator circuit 116 and crystal 150. Another of the functions utilizing the timing signal generated by oscillator circuit 116 and crystal 150 is a disconnect timestamp. When disconnect sense circuitry 112 senses that the signal at DQ pin has been low for more than one full second, indicating that battery pack 100 has been removed from a system, a disconnect timestamp representing disconnect time is written into the disconnect register 138. Upon replacement of battery pack 100 into the system, the determination of how long the battery has been in storage can be made, thereby facilitating self-discharge corrections to the remaining battery capacity.

Still another function utilizing the timing signal generated by oscillator circuit 116 is an end-of-charge timestamp. During the charging of battery cells 154, when current changes direction, as detected by current analog-to-digital converter 120, the charging of battery cells 154 is finished. When this occurs, an end-of-charge timestamp is written to a register. This timestamp further allows the user to calculate the amount of time battery pack 100 has been in a discharge or storage state, further facilitating self-discharge calculations.

The above described timestamps, among other things, are used to calculate the amount of self-discharge of battery cells 154, therefore, the accuracy of the timing signal is very important, as any inaccuracies in the timing will affect the calculation of the amount of self-discharge of battery cells 154.

Although good results have been achieved in the present invention utilizing oscillator circuit 116 and crystal 150 to generate the timing signal as described hereinabove, it is contemplated to be within the scope of this invention that other types of highly accurate, temperature stable timing signal generators could be used, such as, but not by way of limitation, the Dallas Semiconductor DS1075, and other on-chip accurate non-crystal oscillators, and laser trimmed, high accuracy oscillators. It is further contemplated that the timing signal generator could be from another source, such as a microprocessor's clock in the battery pack.

As further depicted in FIG. 1, battery pack 100 includes scratch pad memories 122–128. Scratchpad memories 122–128 help to insure data integrity during communication of data over the one-wire data bus. In operation, data is first written to the scratchpad memory, where it can be read back for verification. After the data has been verified, the data will be transferred to the appropriate page in memory. The process insures data integrity when modifying the contents of the registers. As illustrated, each scratchpad memory contains a cyclic redundancy check (CRC) byte, which is the CRC over all of the bytes in a currently selected scratchpad memory. The CRC is used to validate the communication.

Figure 2:
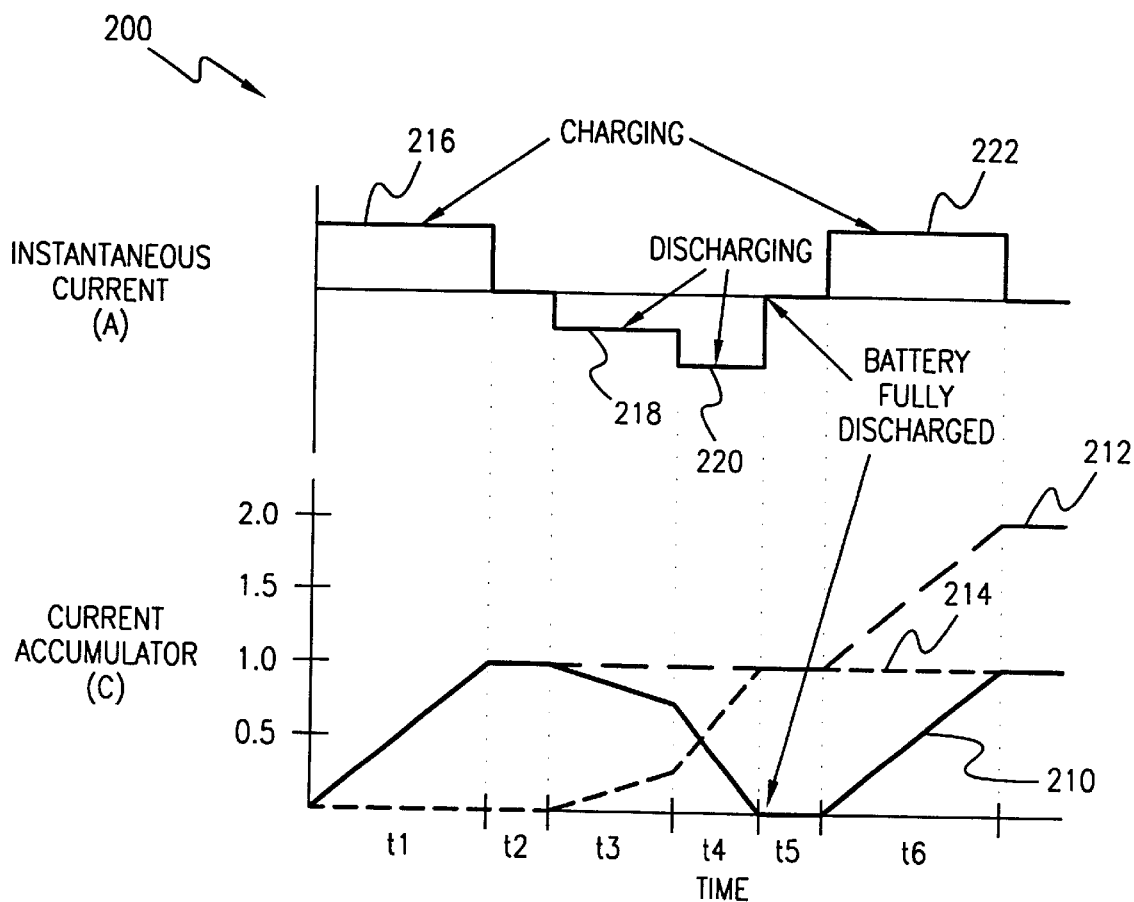
FIG. 2 is a graph illustrating the activity of the current accumulators of the present invention over a sample charge/discharge cycle.

Referring now to FIG. 2, there is illustrated a graph 200 representing the activity of ICA 142, CCA 144, and DCA 146 over a sample charge/discharge cycle of battery cells 154. As depicted, line 210 represents the activity of ICA 142, line 212 represents the activity of CCA 144, and line 214 represents the activity of DCA 146. During time period $t_1$, the first charging period 216, the values of ICA 142 and CCA 144 are increasing as the current flow into the rechargeable battery is positive while DCA 146 remains inactive. However, during time periods $t_3$ and $t_4$, discharge periods 218 and 220, the value of ICA 142 decreases and the value of DCA 146 increases as the current flows out of the rechargeable battery while the value of CCA 144 remains unchanged. During time period $t_6$, the second charging period 222, the values of ICA 142 and CCA 144 again increase, while the value of DCA 146 remains unchanged. As is evident from graph 200, when battery cells 154 become fully discharged and current stops flowing out of the battery cells 154, the values of CCA 144 and DCA 146 are maintained, while the value of ICA 142 will be at or near a count of zero.

As can be appreciated, the accuracy of the clock signal driving ICA, CCA and DCA is very important. Any error that occurs in the clock signal will be directly reflected in accumulators 142, 144 and 146 and thereby give a less accurate reading as to the remaining charge of battery cells 154.

Those skilled in the art can realize that the teachings of the present invention as described hereinabove provides a rechargeable battery pack with highly accurate oscillator driven gas gauge circuitry that is used to accurately determine the remaining operating life of the rechargeable battery pack.

The present invention further provides a rechargeable battery pack with low powered gas gauge circuitry for monitoring and accumulating various operating parameters of the rechargeable battery pack, whereby the determination can be. made as to the remaining operating life of a rechargeable battery pack. The rechargeable battery pack includes a circuitry for measuring the current flow into and out of the rechargeable battery. An integrated current accumulator connected to the circuitry for measuring the current flow is used to maintain a measure of the total net charge having flowed into and out of the rechargeable battery. A charging current accumulator, which is also coupled to the circuitry for measuring the current flow, is used to maintain the total charge having flowed into the rechargeable battery, while a discharging current accumulator is used to maintain the total charge having flowed out of the rechargeable battery. A highly accurate oscillator is used to drive the accumulators to greatly increase the accuracy of the gas gauge functions.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A battery powered device comprising:
   at least one battery cell;
   circuitry coupled to said at least one battery cell for monitoring at leat one parameter relating to the battery powered device; and
   a timekeeper coupled to said circuitry for providing a timing signal to said circuitry; and
   a timestamp circuit coupled to said timekeeper for generating at least one timestamp associated with said at leat one parameter relating to the battery powered device.

2. The device as recited in claim 1, wherein said circuitry comprises:
   a current monitor for measuring at least indications of discharging current from said at least one battery cell at select time intervals.

3. The device as recited in claim 2, wherein
   said at least one battery cell is rechargeable; and
   wherein said current monitor further measures at least one indication of a charging current into said at least one battery cell.

4. The device as recited in claim 2, wherein said circuitry comprises:
   a first accumulator coupled to said current monitor, said first accumulator for accumulating a value indicative of the total amount of energy having flowed out of said at least one battery cell.

5. The device as recited in claim 4, wherein said circuitry further comprises:
   a second accumulator coupled to said current monitor, said second accumulator for accumulating a value indicative of the total amount of energy having flowed into said at least one battery cell.

6. The device as recited in claim 5, wherein said circuitry further comprises:
   a third accumulator coupled to said current monitor, said third accumulator for accumulating a value indicative of the net amount of energy having flowed into and out of said at least one battery cell.

7. The device as recited in claim 1, wherein said timestamp circuit generates an end-ofcharge timestamp in response to completion of the charging of said at least one battery cell.

8. The device as recited in claim 1, wherein said timestamp circuit further generates a disconnect timestamp.

9. The device as recited in claim 8, wherein
   said disconnect timestamp is used to calculate the amount of self-discharge of said at least one battery cell.

10. The device as recited in claim 1, wherein said circuitry further comprises:
    a temperature monitor coupled to said timekeeper.

11. A battery powered device comprising:
    at least one battery cell;
    a current monitor coupled to said at least one battery cell for measuring the discharging current from said at least one battery cell; and
    a clock circuit coupled to said current monitor for generating at least one timestamp associated with at least one parameter relating to the battery powered device.

12. The device as recited in claim 11, wherein said at least one battery cell is configured to recharge.

13. The device as recited in claim 11, wherein said current monitor further measures the charging current.

14. The device as recited in claim 11, further comprising:
    a first accumulator coupled to said current monitor, wherein said first accumulator accumulates the total amount energy having flowed out of said at least one battery cell.

15. The device as recited in claim 14, further comprising:
    a second accumulator coupled to said current monitor, wherein said second accumulator accumulates the total amount of energy having flowed into said at least one battery cell.

16. The device as recited in claim 15, further comprising:
    a third accumulator coupled to said current monitor, wherein said third accumulator accumulates a value indicative of the net amount of energy having flowed into and out of said at least one battery cell.

17. The device as recited in claim 11, further comprising:
    a temperature monitor coupled to said clock circuit, wherein said temperature monitor at least monitors the temperature of said at least one battery cell.

18. The device as recited in claim 11, further comprising:
    a memory to store an identification code.

19. The device as recited in claim 11, wherein said clock circuit generates an end-of-charge timestamp in response to a completion of the charging of said at least one battery cell.

20. The device as recited in claim 11, wherein said clock circuit generates a disconnect timestamp.

21. The device as recited in claim 11, wherein said clock circuit comprises:
    a crystal oscillator.

22. A rechargeable battery pack comprising:
    at least one rechargeable battery cell;
    a current meter coupled to said at least one battery cell for measuring the discharge current from said at least one rechargeable battery cell;
    a discharge current accumulator coupled to said current meter for accumulating the total energy having flowed out of said at least one rechargeable battery cell;
    a clock coupled to said current meter for generating a clock signal to time said current meter that measures the discharge current from said at least one rechargeable battery cell and further to time said discharge current accumulator accumulating the total energy having flowed out of said at least one rechargeable battery cell; and
    a timestamp circuit coupled to said clock circuit for generating at least one timestamp associated with at least one parameter relating to the rechargeable battery pack.

23. The rechargeable battery pack as recited in claim 22, wherein said current meter further comprises:
    a charging current measuring circuit for measuring charging current into said at least one rechargeable battery cell.

24. The rechargeable battery pack as recited in claim 22, further comprising:
    a charge accumulator connected to said current meter, said charge accumulator for accumulating the total energy having flowed into said at least one rechargeable battery cell.

25. The rechargeable battery pack as recited in claim 22, further comprising:

an integrated current accumulator coupled to said current meter, said integrated current accumulator for accumulating the net total of energy having flowed into and out of said at least one rechargeable battery cell.

26. The rechargeable battery pack as recited in claim 22, wherein said clock comprises:

a crystal oscillator.

27. The rechargeable battery pack as recited in claim 22, wherein said timestamp circuit generates an end-of-charge timestamp in response to a completion of the charging of said at least one rechargeable battery cell.

28. The rechargeable battery pack as recited in claim 22, wherein said timestamp circuit further generates a disconnect timestamp.

29. A battery pack comprising:

at least one rechargeable battery cell;

a current monitor coupled to said at least one rechargeable battery cell for measuring the discharge current from said at least one rechargeable battery cell; and a clock circuit coupled to said current monitor for generating a clock signal to time said current monitor measuring the discharge current from said at least one rechargeable battery cell; and a timestamp circuit for generating at least one time stamp associated with at least one parameter relating to the battery pack.

30. The battery pack as recited in claim 29, wherein said current monitor further comprises:

a charge current measuring circuit for measuring charge current into said at least rechargeable one battery cell.

31. The battery pack as recited in claim 29, further comprising:

a discharge accumulator coupled to said current monitor for accumulating the total amount energy having flowed out of said at least one rechargeable battery cell.

32. The battery pack as recited in claim 29, further comprising:

a charging accumulator coupled to said current monitor, said charging accumulator for accumulating the total amount of energy having flowed into said at least one rechargeable battery cell.

33. The battery pack as recited in claim 29, further comprising:

a net current accumulator coupled to said current monitor for accumulating the net amount of energy having flowed into and out of said at least one rechargeable battery cell.

34. The battery pack as recited in claim 29, further comprising:

a temperature monitor.

35. The battery pack as recited in claim 29, wherein said timestamp circuit generates an end-of-charge timestamp in response to a completion of the charging of said at least one rechargeable battery cell.

36. The battery pack as recited in claim 29, wherein said timestamp further generates a disconnect timestamp.

37. The battery pack as recited in claim 29, wherein said clock circuit comprises:

a crystal oscillator.

* * * * *

UNITED STATES PATENT AND TRADEMARK OFFICE
CERTIFICATE OF CORRECTION

PATENT NO. : 6,259,232 B1
DATED : July 10, 2001
INVENTOR(S) : Douglass et al.

It is certified that error appears in the above-identified patent and that said Letters Patent is hereby corrected as shown below:

Column 3,
Line 55, replace "analogto-digital" with -- analog-to-digital --

Column 4,
Line 43, replace "0.01resolution" with -- 0.01C resolution --
Line 48, replace "IC" with -- 1C --
Line 63, replace "$^R$SENS" with -- $R_{SENS}$ --

Column 7,
Line 9, replace "leat" with -- least --
Line 15, replace "leat" with -- least --

Signed and Sealed this

Nineteenth Day of March, 2002

*Attest:*

*Attesting Officer*

JAMES E. ROGAN
*Director of the United States Patent and Trademark Office*